United States Patent [19]

Juhlin et al.

[11] 4,023,087

[45] May 10, 1977

[54] OVERVOLTAGE PROTECTION FOR A DIRECT CURRENT TRANSMISSION

[75] Inventors: Lars Erik Juhlin; Kjell Svensson, both of Ludvika, Sweden

[73] Assignee: Allmanna Svenska Elektriska Aktiebolaget, Sweden

[22] Filed: June 19, 1975

[21] Appl. No.: 588,347

[30] Foreign Application Priority Data

July 19, 1974 Sweden .............................. 7409436

[52] U.S. Cl. .................................. 321/19; 321/27 R
[51] Int. Cl.² ........................................ H02M 7/00
[58] Field of Search ............................ 321/19, 27 R

[56] References Cited
UNITED STATES PATENTS

| | | | |
|---|---|---|---|
| 3,358,211 | 12/1967 | Ekstrom | 321/35 |
| 3,417,291 | 12/1968 | Johansson | 317/33 |
| 3,447,063 | 5/1969 | Hammarlund | 321/5 |
| 3,458,797 | 7/1969 | Larsen | 321/27 R X |
| 3,487,286 | 12/1969 | Persson | 321/2 |
| 3,526,779 | 9/1970 | Uhlmann | 307/20 |

*Primary Examiner*—William M. Shoop
*Attorney, Agent, or Firm*—Watson, Cole, Grindle & Watson

[57] ABSTRACT

A rectifier station for high voltage direct current transmission includes a rectifier bridge with a control system. In order to limit the direct voltage of the station in the event of disturbances, the control system is provided with arrangements for sensing the direct voltage of the station and the derivative of such voltage. The arrangement supplies signals to limit the voltage increase of the station when the voltage and derivative exceed given values by increasing the delay angle of the station.

5 Claims, 4 Drawing Figures

OVERVOLTAGE PROTECTION FOR A DIRECT CURRENT TRANSMISSION

BACKGROUND OF THE INVENTION

1. Field of the Invention

The present invention relates to a rectifier station for a DC transmission which includes a rectifier bridge with a control system. More particularly, the invention relates to protecting devices for overvoltages which may occur when the rectifier is started and controlled towards a so-called "open" line, that is, a line that is broken so that it does not conduct any current, either due to a fault on the line itself, or which is more common, due to a fault in the inverter station connected to the line. Since no current flows in the line, the rectifier control will control the rectifiers towards the smallest delay angle and thus the maximum voltage. As a consequence of a failing line current, a so-called top rectification will occur, that is, charging of the capacitances of the line to a voltage corresponding to the amplitude value of the alternating voltage without the voltage smoothing which a current would lead to. To this is to be added the voltage reflection on the line, which is an inevitable result of the open line. In particular in the case of cable transmission which are very sensitive to overvoltages and also have great capacitances, such overvoltages place heavy demands on the discharge protection of the line.

2. The Prior Art

Instead of waiting for the discharge protectors to start operating, various solutions have been proposed to indicate overvoltages in time and to reduce the current of the rectifier, or at least limit its current increase.

SUMMARY OF THE INVENTION

The present invention is based on the circumstance that, if the rectifier voltage during the start control approaches the rated value and, at the same time, the voltage derivative has still a relatively high value,, it may be expected that an overvoltage is likely to occur on the line within the next few moments. According to the invention, the voltage and the voltage derivative of the rectifier are then sensed, and in this way any overvoltages can be predicted and the necessary measures taken. The direct voltage of the station and the derivative of the voltage control an arrangement which delivers signals to limit the voltage increase of the station when the voltage and derivative exceed given values by increasing the delay angle of the station, in response to the sum of the voltage and derivative.

BRIEF DESCRIPTION OF THE DRAWINGS

In other respects the invention will be explained in more detail with reference to the accompanying drawing, in which.

DESCRIPTION OF THE PREFERRED EMBODIMENTS

Figure 1:
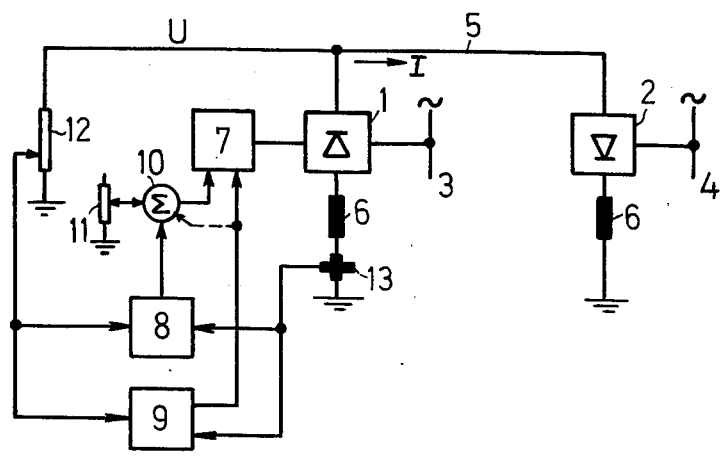
FIG. 1 shows a DC transmission with an overvoltage protector according to the invention.
Figure 2:
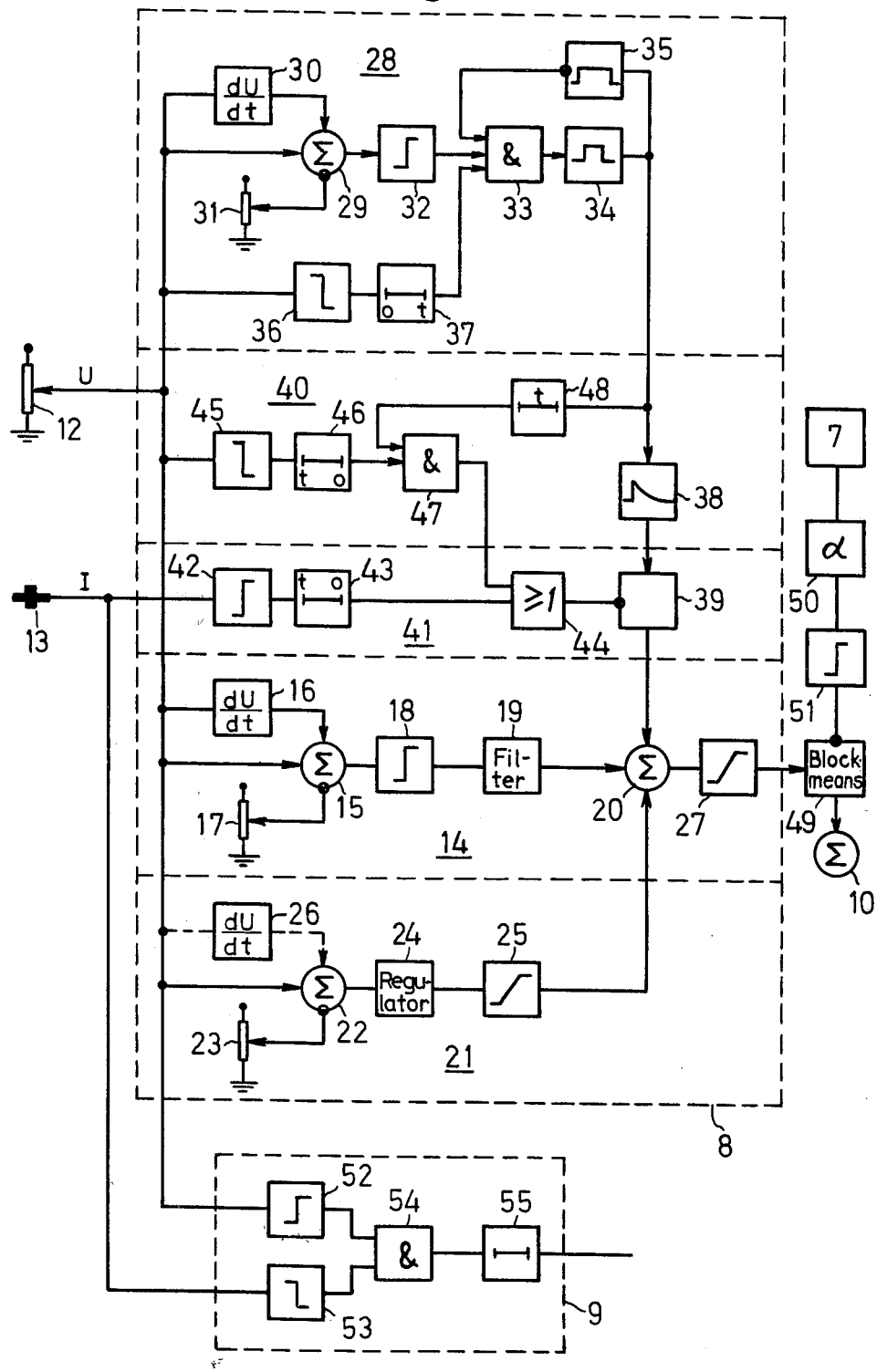
FIG. 2 shows one example of the detailed embodiment of such a protector.

FIG. 1 shows a DC transmission for high voltage comprising a rectifier station 1 and an inverter station 2. Each station is connected to an AC network 3 and 4, respectively, and the stations are connected to each other by way of a DC line 5 and connected to earth by way of a smoothing reactor 6. The rectifier station is provided with a control system 7 which, for example, may be constructed according to U.S. Pat. No. 3,551,778. For such a control system a limit value emitter for the maximum and minimum delay angle is required, and the latter is well suited for affecting the control to temporarily reduce the direct voltage of the rectifier station, as indicated in FIG. 1. A reference value for the minimum value of the delay angle $\alpha$ is taken out from a potentiometer 11 and is fed by way of a summation member 10 into the input of the control system 7 for limiting $\alpha_{min}$. To another input on 10 there is connected a device 8 according to the invention for sensing the line voltage from a voltage divider 12. As will be described in more detail with reference to FIG. 2, a magnitude is derived in the device 8 in dependence on the line voltage, which magnitude is added to the reference value from 11, the minimum value for the delay angle of the rectifier valves thus increasing and the rectifier voltage decreasing. In parallel with the device 8 there is a supplementary device 9 which is also described in more detail in connection with FIG. 2 and which delivers a signal about voltage reduction to the control system 7 if the direct current in the rectifier station is zero or very low, at the same time that the direct voltage is high. such a signal combination can normally be interpreted as if the rectifier station is working towards an open line. In this way the devices 8 and 9 are complementary to each other. As is clear, 9 is connected to the voltage divider 12 and a current measuring member 13, for example a measuring transductor. FIG. 2 shows in more detail the devices 8 and 9 in FIG. 1, connected to the voltage and current measuring members 12 and 13 in FIG. 1. The device 8 may contain one or more of a number of parallel circuits 14, 21 and 28, which are connected to a summating member 20 on the output side of 8, from which the total addition to the $\alpha_{min}$ value from 11 is obtained. Between the summation members 20 and 10 in FIG. 1 there is connected a limiting circuit 27, the total addition to the $\alpha_{min}$ value thus being limited to a reasonable value. The circuit 14 contains a summating member 15 to which there is connected the line voltage U from the voltage divider 12, as well as the derivative (dU/dt) of this voltage derived in a derivative member 16, and also a reference value emitter 17 which indicates a maximum value for the sum of U and (dU/dt). These three quantities are so adjusted that, when the sum of U and (dU/dt) exceeds the reference value from 17, the line voltage is approaching impermissible values. On the output from 15 there is therefore a discriminator 18 which emits a signal to 20 when said sum exceeds the reference value. A smoothing filter 19 is inserted between 18 and 20 for a soft switching on and off of the signal from 18. The signal from 18 provides a substantially permanent addition to $\alpha_{min}$. In parallel with the circuit 14 is the circuit 21, which has the characteristics of a voltage regulator which becomes active when the line voltage U exceeds a certain value. To the summating member 22 there are connected the voltage U from 12 and a reference value emittter 23. 22 is connected by way of a regulator 24 and a limiter 25 to the summating member 20. The control signals from 24 pass through 25 when U exceeds the reference value from 23 but are limited to a maximum value to avoid too high values on the delay angle α in the control device 7. The circuit 21 may possibly be supplemented with a derivation member 26 which provides a certain addition to the voltage U in the summating member 20. The signal from 24 is thus substantially dependent on the difference between the direct voltage U and the reference value from 23 when U exceeds this reference value.

The circuit 28 has approximately the same basic components as the circuit 14, namely a summating member 29 to which there are connected the voltage U, as well as the voltage derivative (dU/dt) from the derivative 30, a well as the reference value emitter 31. On the output side of 29 there is a discriminator 32 which delivers a signal when the sum of the voltage and the voltage derivative exceeds the reference value. The signal from 32 is passed by way of an AND gate 33 to a pulse transducer 34 which delivers a single pulse as an addition to $\alpha_{min}$.

Said single pulse has a constant length, and it must therefore be ensured that this pulse is not released at an inconvenient time. This is done with the help of the AND gate 33 which has two inputs besides the input from 32. To the upper input there is connected the pulse transducer 35 influenced by 34 and with a negative output which delivers a blocking signal to 34 for a certain time after the pulse from 34 has been released. In this way a repeated signal from 34 is prevented. To the lower input on 33 there is connected the discriminator 36 influenced by the voltage U. 36 emits a signal when the voltage U falls below a certain value, which signal is maintained for a certain time by the releasing delay device 37. The signal from 32 is therefore only released through 33 if and a certain time after the line voltage U has dropped below the value set in 36.

If we compare the circuits 14, 21 and 28 we will find that 14 delivers a permanent additional signal to $\alpha_{min}$ if the sum of the current line voltage and its derivative exceeds the reference value from 17; thus a signal of an on-off nature. 21 delivers an additional signal which controls the line voltage corresponding to the reference value from 23, possibly with an addition for the voltage derivative. This signal therefore has the character of a control signal which, however, is rather slow. The circuit 28 in its turn delivers one single signal pulse when the sum of the line voltage and the derivative exceeds the reference value from 31. The circuits 14 and 28 will therefore supplement the control signal from 21.

At the output side from 34 there may be introduced a pulse shaping device 38 which, for example, changes the square pulse from 34 to a decaying pulse. In this way the initial value of the pulse may be chosen higher so that a more powerful effect is attained.

As mentioned it should be ensured that the circuit 28 does not cause an unjustified operation if the line voltage U remains at a low value despite a high signal from the derivative 30, or if the line current lies above a certain value. This can be made with the help of the throttling member 39, controlled by the voltage and current circuits 40 and 41.

The current circuit 41 has a discriminator 42 which emits a signal by way of an operating delay circuit 43 when the direct current I lies permanently above a certain value. This signal is supplied to the member 39 by way of the OR circuit 44, the member 39 thus blocking the pulse from 38 so that it does not reach the summation member 20.

Similarly, the voltage circuit 40 has a discriminator 45 which delivers a blocking signal to 39 by way of the operating delay member 46 and the OR-circuit 44 when the voltage U is permanently below a certain value. The operation of 45, 46 has been combined with the pulses from 34 through the delay member 48 and the AND gate 47 so that the blocking signal from 40 is not delivered until a certain time after the pulse from 34.

The derivation circuits 16, 26 and 30 can in principle have the same construction even if they have different dimensions and different limiting circuits. Thus 26, which may possibly be entirely omitted, is dimensioned to deliver a rather weak signal, whereas 30 should be dimensioned to give a strong signal in order for the circuit 28 to be able to emit a signal also in the case of a low line voltage. 16 is suitably dimensioned somewhere between these values. As has been mentioned before, one or more of the circuits in the device 8 in FIG. 2 may be omitted.

Further, it should be pointed out that the $\alpha_{min}$ value in practice is often represented by a $U_{min}$ value, that is, a certain lower limit which the commutating voltage has to exceed before a firing pulse is released. The basic value of $U_{min}$ is most commonly chosen so that it ensures a reasonably fast and precise ignition of the valves and a rapidly performed commutation. In such a voltage scale it must then be ensured at the same time that the resulting $U_{min}$ value does not exceed the maximum value of the commutating voltage, for example in connection with a voltage reduction on the alternating voltage side of the rectifier, since this would result in a failing commutation and therefore a disturbance in the operation.

Figure 3:
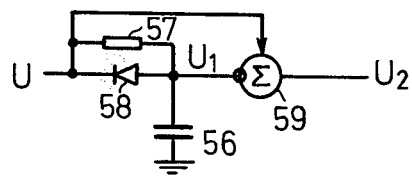
FIG. 3 shows a detail of FIG. 2.

FIG. 3 shows examples of how the derivation circuits 16, 26 and 30 may be designed. The derivation capacitor 56 is provided with separate charging and discharging circuits, namely the resistor 57 and the diode 58, respectively. The output side of the derivation circuit consists of the summator 59, where the line voltage and the capacitor voltage are subtracted from each other.

Figure 4:
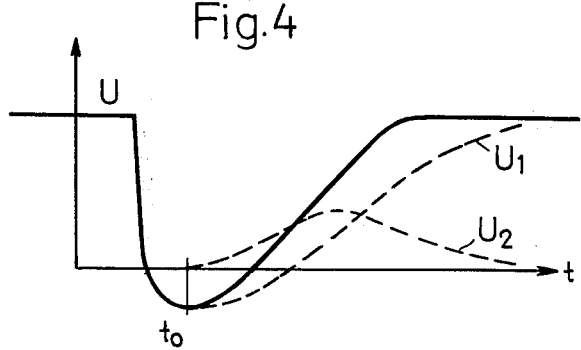
FIG. 4 voltage curves therefor.

The function is clear from the voltage diagram in FIG. 4, where the line voltage U, the capactior voltage $U_1$ and the output voltage $U_2$ have been shown.

The protection device according to the invention operates in the case of a fast voltage increase after a strong voltage reduction, that is, from the moment $t_0$. Up to this moment the capacitor voltage $U_1$ follows the line voltage U because of the discharging diode 58. After the moment $t_0$, $U_1$ increases more slowly than U because of the resistor 57. The output signal from 59 appears as the difference between these voltage values. By varying the dimensions of 56 and 57, exactly the properties which are desired in the circuits 16, 26 and 30 may be obtained. The particular embodiment of the derivation circuits according to FIG. 3 means that the effect of the direct voltage ripple is eliminated.

If the rectifier valves operate within an area with a high delay angle, the signal from 8 should suitably be blocked, since the commutation between the valves may be jeopardized also in this case if the alternating voltage at the same time is low. This can be done by means of the blocking member 49 affected by the momentary value of the delay angle.

The delay angle is measured by the member 50 connected to the control system 7. The member 50 may be designed according to U.S. Pat. No. 3,806,793. The discriminator senses if the delay angle exceeds a certain value, for example 70°–90° and emits a blocking signal to 49.

FIG. 2 shows also the device 9 from FIG. 1. This device contains discriminators 52 and 53 for voltage and current, which emit signals when the voltage exceeds and the current falls below certain values. The signals are passed by way of the AND gate 54 and the delay member 55, and the output from there may be connected, for example, to the control system 7 for blocking it at said signal combination. Another possibility, which is indicated by a broken line in FIG. 1, is to let the signal from 9 constitute an additional signal to $\alpha_{min}$ by connecting 9 to 10. The device 9 may be regarded as an extra precaution if the device 8 is not able to prevent a possible overvoltage. Instead using the signals from member 8 and 9 for increasing the 2 min reference via member 10 it is possible to use the signal from member 8 and 9 for a direct increasing action of the control angle $\alpha$ in the control system F.

We claim:

1. Rectifier station (1) for a high voltage direct current transmission (5) comprising a rectifier bridge with a control system (7), and means to limit the direct voltage of the station in the event of disturbances on the transmission, said means comprising devices (12,8) in the control system for sensing the direct voltage of the station and developing the derivative of this voltage, said devices including means to deliver signals to limit the voltage increase of the station when said voltage and derivative exceed given values.

2. Rectifier station according to claim 1, in which said sensing and developing devices (8) comprise a summator (15) for summing up the values for said voltage and derivative and in which said devices deliver said limiting signal when said sum exceeds a given value.

3. Rectifier station according to claim 1, further comprising a device (50) for measuring the delay angle ($\alpha$) of the valves, which device includes means to limit said limiting signal when said delay signal a certain value.

4. Rectifier station according to claim 1, in which there is provided in parallel with said device (8) for voltage-dependent control limitation devices for measuring the direct voltage and direct current (52,53 respectively) of the station, said measuring means including level indicators for delivering a signal when the direct voltage exceeds and the direct current falls below given values, respectively, means responsive to the combination of said signals to limit the start control of the station.

5. Rectifier station according to claim 1, in which said device (8) for sensing and deriving the direct voltage and voltage derivative, respectively, of the station comprises a number of parallel circuits for said sensing and derivation, which circuits have different characteristics and different threshold and limiting values.

* * * * *